United States Patent
Jang et al.

(10) Patent No.: US 7,837,120 B1
(45) Date of Patent: Nov. 23, 2010

(54) MODULAR MEMORY CARD AND METHOD OF MAKING SAME

(75) Inventors: Sang Jae Jang, Gwangjin-gu (KR); Chul Woo Park, Gangdon-gu (KR); Choon Heung Lee, Kwangju-si (KR)

(73) Assignee: Amkor Technology, Inc., Chandler, AZ (US)

( * ) Notice: Subject to any disclaimer, the term of this patent is extended or adjusted under 35 U.S.C. 154(b) by 1376 days.

(21) Appl. No.: 11/288,906

(22) Filed: Nov. 29, 2005

(51) Int. Cl.
*G06K 19/06* (2006.01)

(52) U.S. Cl. .................. 235/492; 235/380; 235/451

(58) Field of Classification Search ............... 235/492, 235/380, 451, 441; 438/638, 106
See application file for complete search history.

(56) References Cited

U.S. PATENT DOCUMENTS

| | | |
|---|---|---|
| 3,668,299 A | 6/1972 | McNeal |
| 4,532,419 A | 7/1985 | Takeda |
| 4,905,124 A | 2/1990 | Banjo et al. |
| 4,974,120 A | 11/1990 | Kodai et al. |
| 5,172,214 A | 12/1992 | Casto |
| 5,360,992 A | 11/1994 | Lowrey et al. |
| 5,574,309 A | 11/1996 | Papaietro et al. |
| 5,742,479 A | 4/1998 | Asakura |
| 5,753,532 A | 5/1998 | Sim |
| 5,784,259 A | 7/1998 | Asakura |
| 5,789,280 A | 8/1998 | Yokota et al. |
| 5,808,359 A | 9/1998 | Muto et al. |
| 5,822,190 A | 10/1998 | Iwasaki |
| 5,893,724 A | 4/1999 | Chakravorty et al. |
| 5,977,613 A | 11/1999 | Takata et al. |
| 6,040,622 A | 3/2000 | Wallace |
| 6,143,981 A | 11/2000 | Glenn |
| D445,096 S | 7/2001 | Wallace |
| D446,525 S | 8/2001 | Okamoto et al. |
| 6,376,283 B1 | 4/2002 | Chen |
| 6,384,472 B1 | 5/2002 | Huang |
| 6,462,273 B1 | 10/2002 | Corisis et al. |
| 6,476,469 B2 | 11/2002 | Hung et al. |
| 6,545,332 B2 | 4/2003 | Huang |
| 6,603,196 B2 | 8/2003 | Lee et al. |
| 6,624,005 B1 | 9/2003 | DiCaprio et al. |
| 2002/0140068 A1 | 10/2002 | Lee |

FOREIGN PATENT DOCUMENTS

| | | |
|---|---|---|
| JP | 3112688 | 5/1991 |
| JP | 7017175 | 1/1995 |
| JP | 8190615 | 7/1996 |
| JP | 10334205 | 12/1998 |
| KR | 199410938 | 5/1994 |
| KR | 199552621 | 12/1995 |

*Primary Examiner*—Edwyn Labaze
(74) *Attorney, Agent, or Firm*—Stetina Brunda Garred & Brucker

(57) ABSTRACT

In accordance with the present invention, there is provided multiple embodiments of a memory card, each embodiment including a module comprising at least a printed circuit board having an electronic circuit device mounted thereto. The module is inserted into a complementary cavity formed within a case of the memory card, such case generally defining the outer appearance of the memory card. The module is secured within the cavity of the case through the use of an adhesive. In each embodiment of the present invention, the module is uniquely configured to prevent adhesive leakage from within the corresponding cavity of the case of the memory card when the module is secured within the cavity.

19 Claims, 12 Drawing Sheets

MODULAR MEMORY CARD AND METHOD OF MAKING SAME

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates generally to memory cards, and more particularly to a memory card (e.g., a multi-media card or secure digital card) comprising a semiconductor device module which is configured to be interfaced to an external case in manner maintaining prescribed tolerances between the module and the case, and preventing undesirable adhesive leakage from within a cavity of the case into which the module is advanced.

As is well known in the electronics industry, memory cards are being used in increasing numbers to provide memory storage and other electronic functions for devices such as digital cameras, MP3 players, cellular phones, and personal digital assistants. In this regard, memory cards are provided in various formats, including multi-media cards and secure digital cards.

Many memory cards include a module which itself comprises a printed circuit board (PCB) having a conductive wiring pattern disposed thereon. Attached to one side or surface of the PCB and electrically connected to the conductive pattern thereof is a plurality of electronic circuit devices, such as semiconductor packages, semiconductor dies, and/or passive elements. These electronic circuit devices and a portion of the PCB are often covered or encapsulated by an encapsulant material. The PCB also includes a plurality of input/output (I/O) pads disposed on the side or surface thereof opposite that having the electronic circuit devices thereon. These I/O pads are not covered by the encapsulant material, and thus are exposed in the completed module which comprises the PCB, the electronic circuit devices and the encapsulant material. In certain memory card designs, the completed module is inserted into a complementary cavity formed within a case of the memory card, such case generally defining the outer appearance of the memory card. The module is secured within the cavity of the case through the use of an adhesive such that the I/O pads disposed on the PCB are not covered by the case, and thus remain exposed in the fully assembled memory card. These I/O pads of the memory card provide an external interface for an insertion point or socket. The completed memory card has a generally rectangular configuration, with most memory cards including a chamfer formed at one edge thereof which is adjacent to the I/O pads.

The above-described module typically has a generally quadrangular configuration, with the cavity formed in the case also having a generally quadrangular configuration corresponding to the shape of the module. As a result, in order to smoothly guide and insert the module into the cavity in the case, it is typically necessary to size the cavity relative to the case such that a sufficient tolerance or clearance is provided between the side surfaces of the module and the internal side walls of the cavity in the case. More particularly, in order to smoothly guide and insert the module into the cavity, a gap of at least 0.15 millimeters is typically needed between each side surface of the module and the corresponding internal side wall of the cavity. However, when a gap of the required size or width of about 0.15 millimeters is defined between each side surface of the module and the corresponding internal side wall of the cavity, adhesive applied between the top surface of the module and the internal top wall of the cavity typically flows through such gaps and drains out of the cavity to the bottom surface of the case. As will be recognized, the adhesive leaking from within the cavity contaminates the outside of the memory card. In addition, since a mounting error of at least 0.15 millimeters may occur when the module is fixed within the cavity, the positions of the I/O pads of the PCB are variable. In this regard, there is a possibility that an ESC (electrostatic current) pad may not meet a required regulation. Further, if the module is deflected to one side of the cavity, a gap of about 0.30 millimeters may be formed at the opposite side of the cavity, thus creating a gap that is visible to the naked eye and deteriorates from the external appearance of the memory card.

The present invention addresses and overcomes these drawbacks by providing a memory card construction wherein the module of the memory card is uniquely configured to prevent adhesive leakage from within the corresponding cavity of the case of the memory card when the module is secured within the cavity. These as well as other features and advantages of the present invention will be described in more detail below.

BRIEF SUMMARY OF THE INVENTION

In accordance with the present invention, there is provided multiple embodiments of a memory card, each embodiment including a module comprising at least a printed circuit board having an electronic circuit device mounted thereto. The module is inserted into a complementary cavity formed within a case of the memory card, such case generally defining the outer appearance of the memory card. The module is secured within the cavity of the case through the use of an adhesive. In each embodiment of the present invention, the module is uniquely configured to prevent adhesive leakage from within the corresponding cavity of the case of the memory card when the module is secured within the cavity.

The present invention is best understood by reference to the following detailed description when read in conjunction with the accompanying drawings.

BRIEF DESCRIPTION OF THE DRAWINGS

These, as well as other features of the present invention, will become more apparent upon reference to the drawings wherein.

Common reference numerals are used throughout the drawings and detailed description to indicate like elements.

DETAILED DESCRIPTION OF THE INVENTION

Figure 1A:
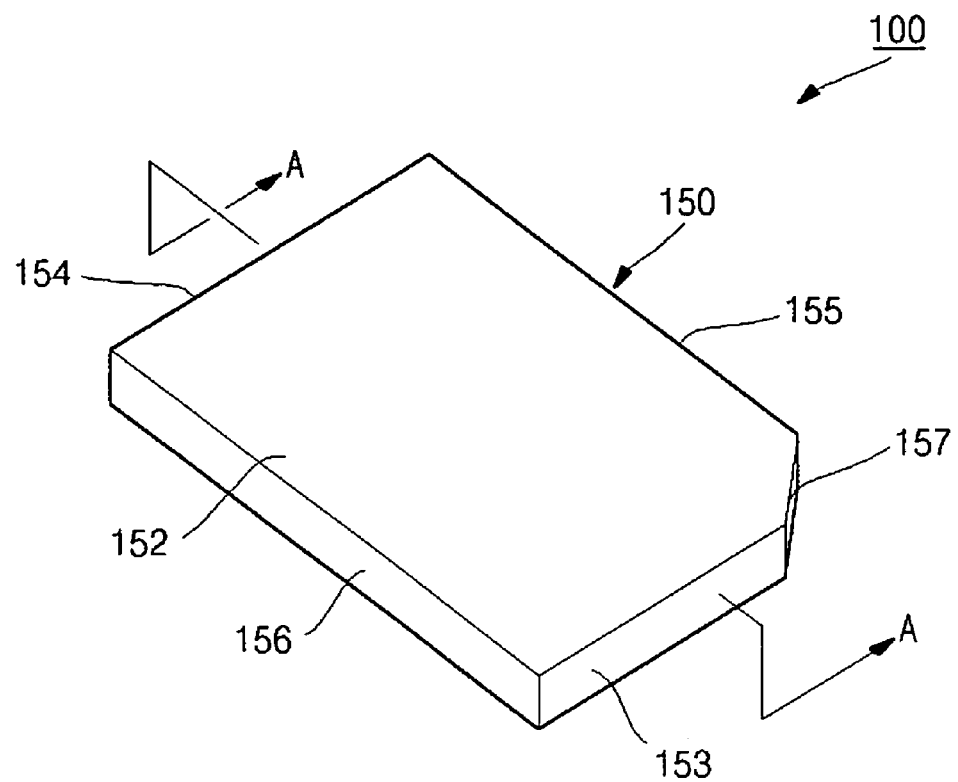
FIG. 1A is a top perspective view of a memory card including a memory card module constructed in accordance with a first embodiment of the present invention.
Figure 1B:
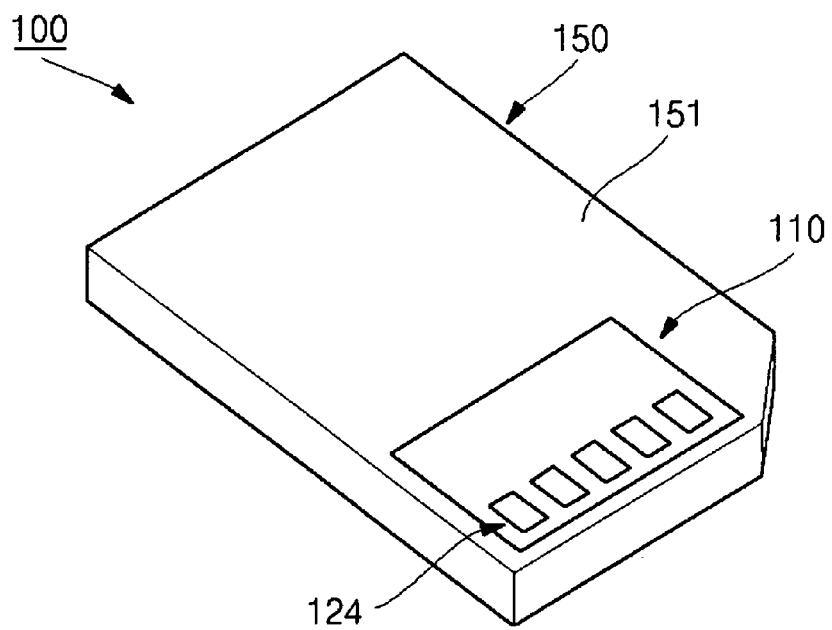
FIG. 1B is a bottom perspective view of the memory card shown in FIG. 1A.
Figure 1C:
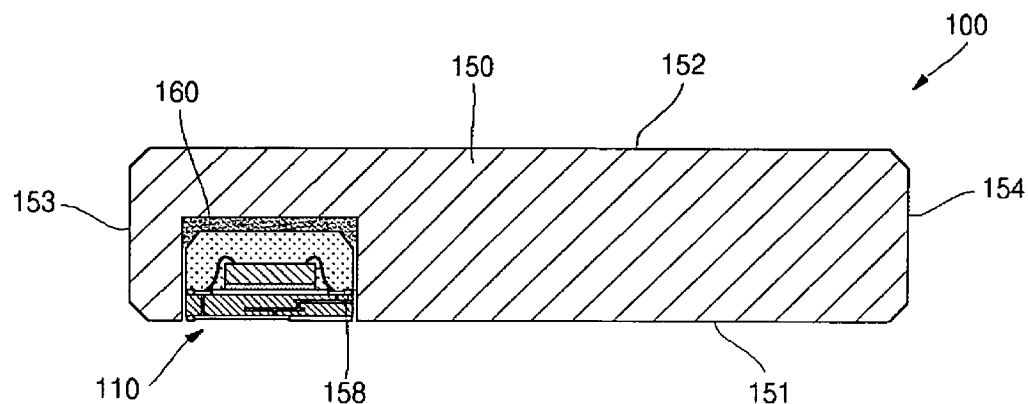
FIG. 1C is a cross-sectional view taken along line A-A of FIG. 1A.

Referring now to the drawings wherein the showings are for purposes of illustrating preferred embodiments of the present invention only, and not for purposes of limiting the same, FIGS. 1A-1C depict a memory card 100 including a memory card module 110 (shown in FIGS. 2A-2B) constructed in accordance with a first embodiment of the present invention. The memory card 100, as well as the memory cards of other embodiments of the present invention which will be described in more detail below, may be a multi-media card (MMC), a reduced size multi-media card (RSMMC), or a secure digital (SD) card.

The module 110 of the memory card 100 comprises a circuit board 120, which itself includes an insulative layer 123 defining a generally planar lower surface 121 and an opposed, generally planar upper surface 122. Formed on the lower surface 121 of the insulative layer 123 in close proximity to one of the peripheral edge segments thereof is a plurality of input/output (I/O) pads 124. All or a substantial portion of the remainder of the lower surface 121 of the insulative layer 123 is covered by a solder mask 127. As seen in FIG. 1B, the insulative layer 123 has a generally quadrangular configuration, with the I/O pads 124 extending along and in close proximity to a common one of the longitudinally extending sides of the insulative layer 123. The longitudinally extending side of the insulative layer 123 disposed closest to the I/O pads 124 will hereinafter be referred to as the front side, with the opposite longitudinally extending side of the insulative layer 123 being referred to as the back side. Formed on the upper surface 122 of the insulative layer 123 is a conductive pattern 125 which is placed into electrical communication with the I/O pads 124 on the lower surface 121 through a conductive medium 126 formed through and/or upon the insulative layer 123. Such conductive medium 126 may include conductive vias which extend through the insulative layer 123, conductive traces which extend along the upper and lower surfaces 122, 121 of the insulative layer 123, or combinations thereof. All or a substantial portion of the remainder of the upper surface 122 of the insulative layer 123 is also covered by a solder mask 127. The circuit board 120 can be a hardened printed circuit board, a flexible printed circuit board, or any equivalent thereto, the present invention not being restricted to any particular type of circuit board 120.

Figure 2A:
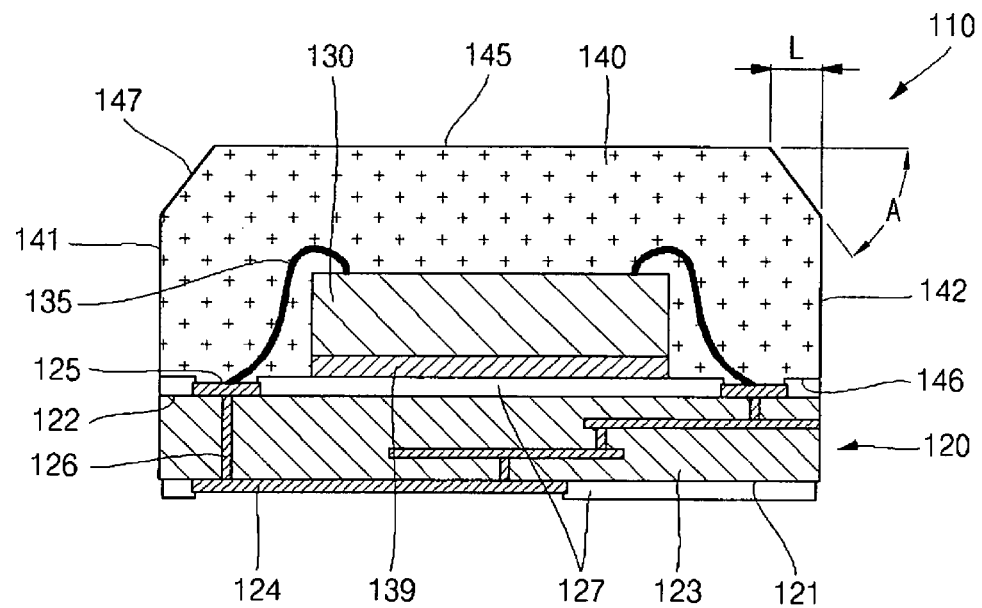
FIG. 2A is an enlarged cross-sectional view of the module of the memory card shown in FIG. 1C.

Mounted to the solder mask 127 disposed upon the upper surface 122 of the insulative layer 123 of the circuit board 120 is an electronic circuit device 130. The mounting of the electronic circuit device 130 to the solder mask 127 is preferably facilitated by a layer 139 of a suitable adhesive. As best seen in FIG. 2A, the electronic circuit device 130 comprises a semiconductor die which is electrically connected to the conductive pattern 125 formed on the upper surface 122 through the use of conductive wires 135. As will be recognized, the conductive pattern 125 and/or conductive medium 126 of the circuit board 120 may be used to facilitate the placement of the electronic circuit device 130 into electrical communication with the I/O pads 124 in any desired pattern or arrangement. Those of ordinary skill in the art will recognize that rather than comprising only a semiconductor die, the electronic circuit device 130 may comprise a semiconductor die or a semiconductor package in combination with various passive devices (e.g., a resistor and/or a condenser). In this regard, the type, number and arrangement of the components included in the electronic circuit device 130 may be selectively varied depending on the desired application for the memory card 100. All that is necessary is that the circuit board 120 be configured to facilitate the electrical communication between any such component(s) and the I/O pads 124 in a prescribed manner. Along these lines, the number of I/O pads 124 included in the circuit board 120 is also variable, in that the number of such I/O pads 124 may be varied according to the particular application for the memory card 100.

Figure 2B:
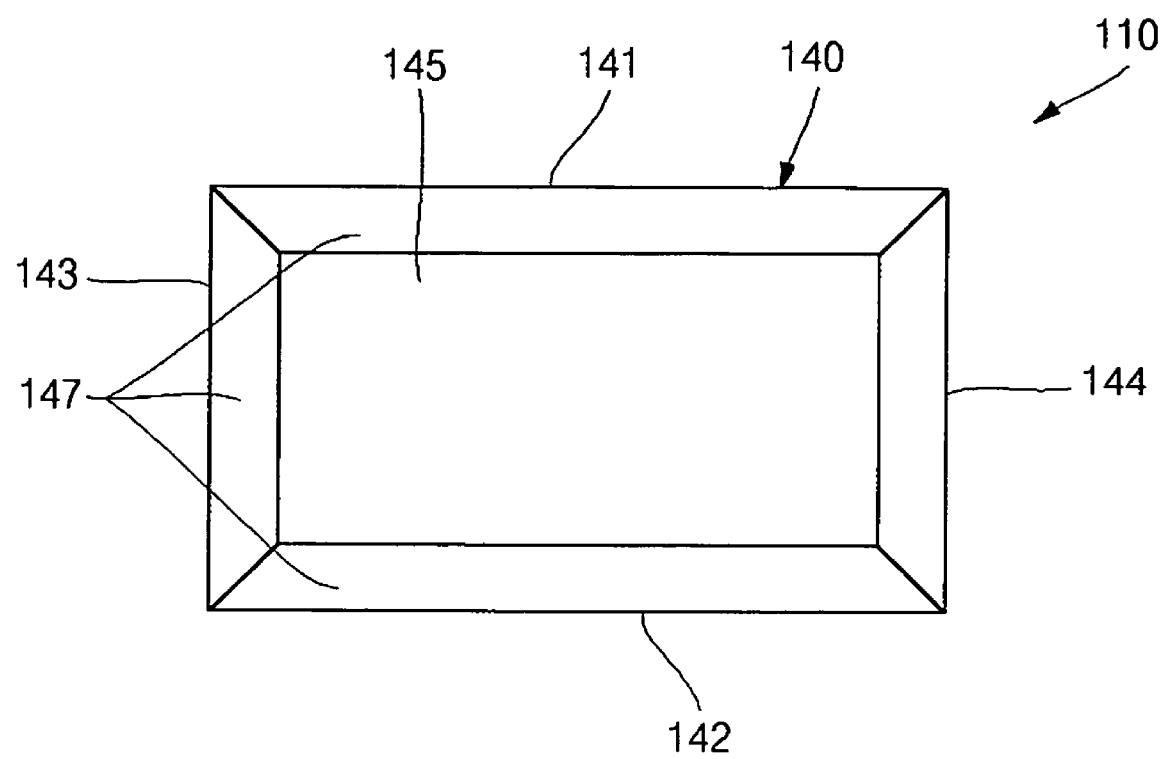
FIG. 2B is a top plan view of the module shown in FIG. 2A.
Figure 3A:
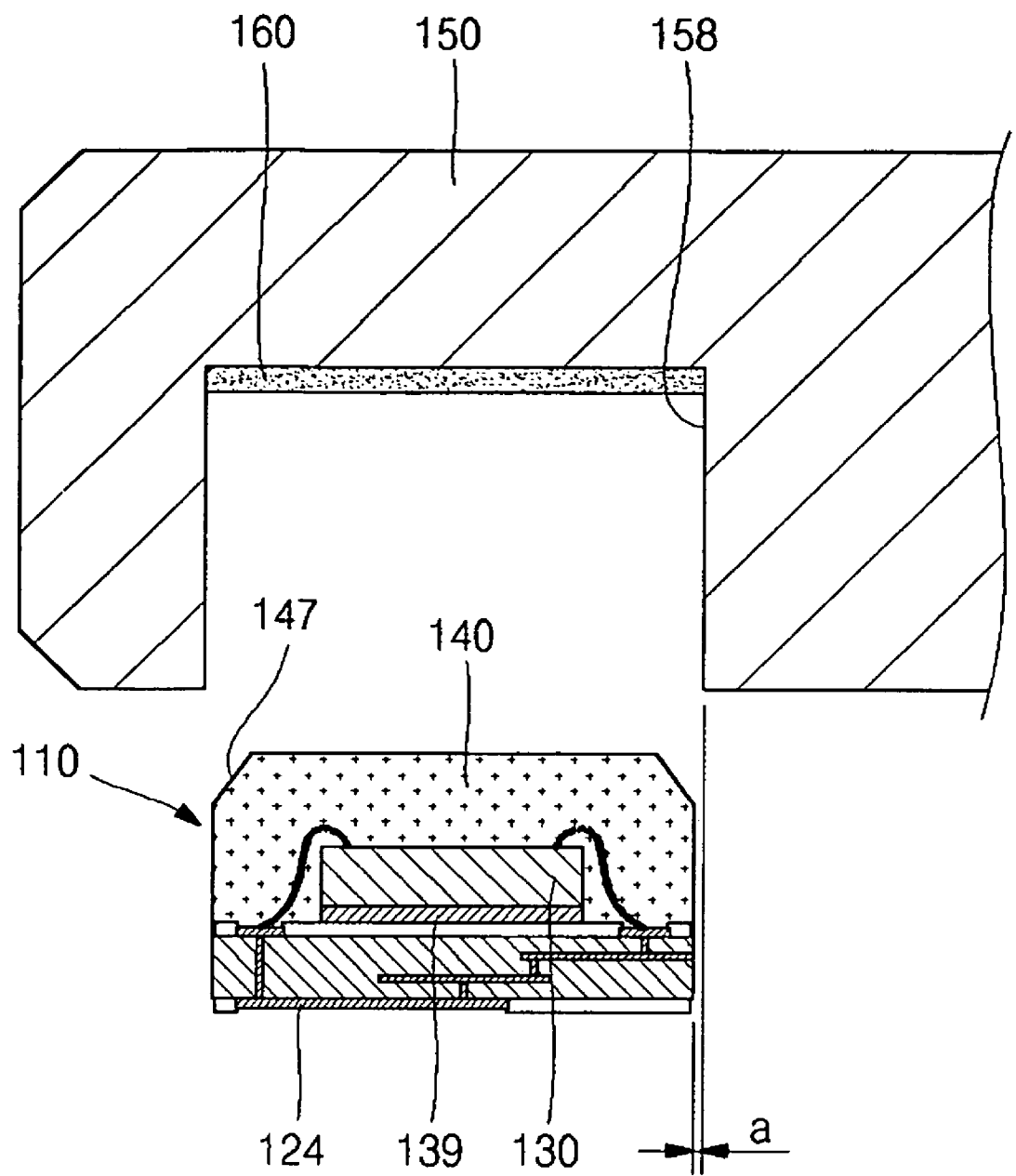
FIGS. 3A-3D are partial cross-sectional views illustrating relative positional relationships between the module of the first embodiment and the case of the memory card during the process of fully inserting the module into and securing the module within the corresponding cavity of the case.
Figure 3B:
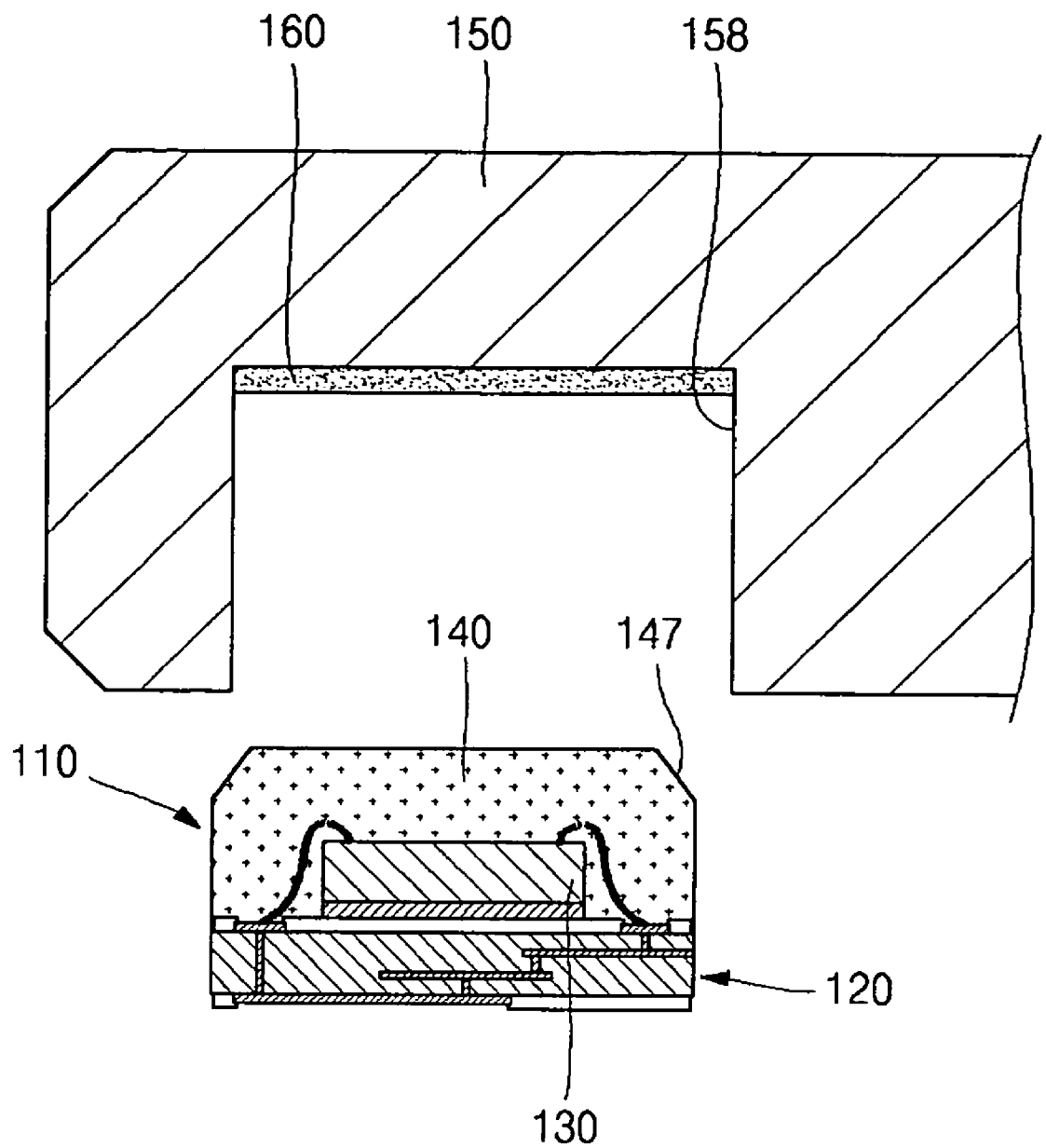
Figure 3C:
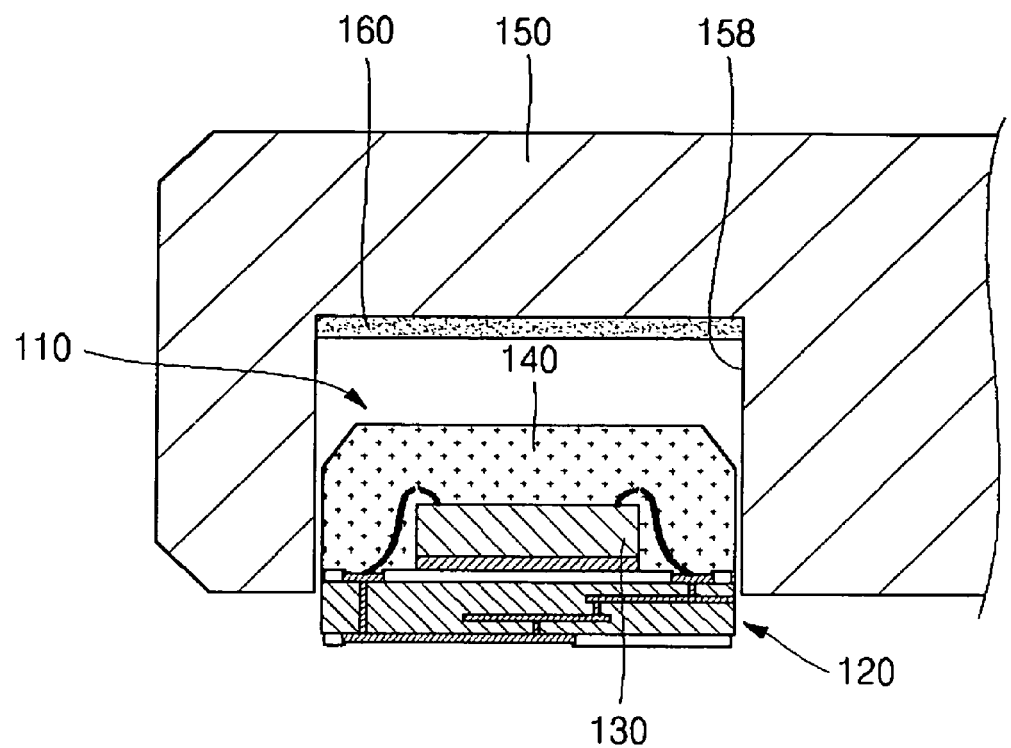
Figure 3D:
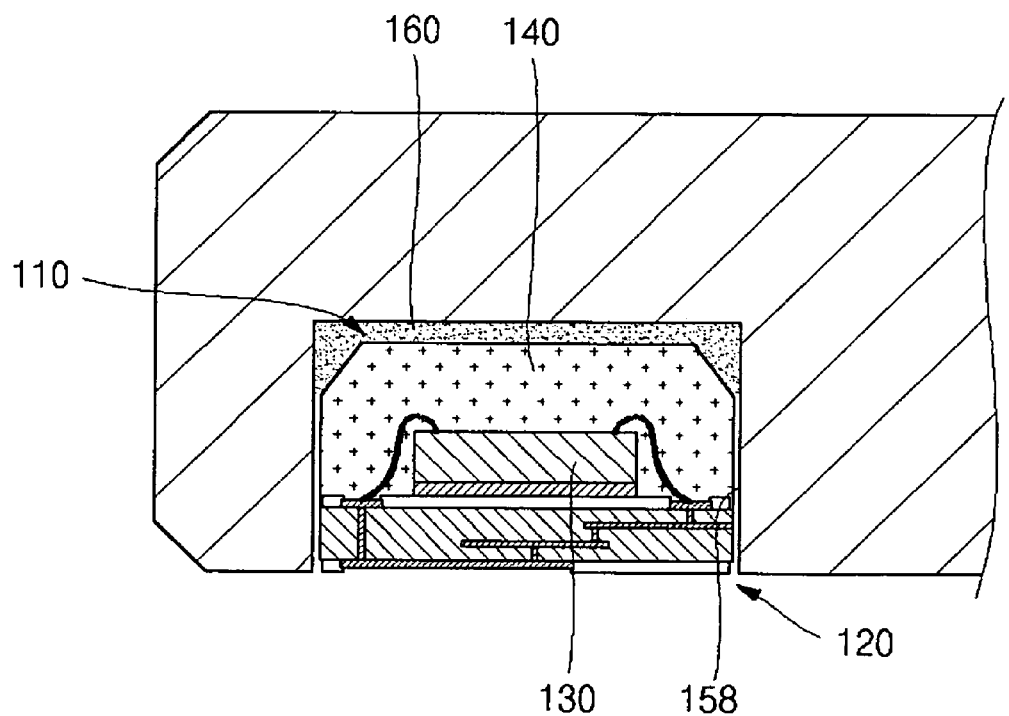

As best seen in FIGS. 2A and 2B, in the module 110 of the first embodiment, the electronic circuit device 130, the conductive pattern 125, the conductive wires 135, and the solder mask 127 disposed upon the upper surface 122 of the insulative layer 123 are covered by a layer of encapsulant material which hardens into a body 140 of the module 110. The body 140 may be formed from an epoxy molding compound, a glop top, or an equivalent thereof. The body 140 defines a generally planar front side surface 141 which is substantially flush or continuous with the front side of the insulative layer 123. In addition to the front side surface 141, the body 140 defines a generally planar rear side surface 142 which is substantially flush or continuous with the back side of the insulative layer 123, and an opposed pair of generally planar lateral side surfaces 143, 144 which are substantially flush with respective ones of the longitudinally extending sides of the insulative layer 123 which extend generally perpendicularly between the front and back sides thereof. The body 140 further defines a generally planar top surface 145. In the module 110, the height of the body 140 (i.e., the distance separating the top surface 145 from the solder mask 127 disposed upon the upper surface 122 of the insulative layer 123) is predetermined according to the height of the electronic circuit device 130 encapsulated by the body 140.

Formed in the body 140 of the module 110 between the side surfaces 141, 142, 143, 144 and the top surface 145 are chamfers 147. The chamfers 147 are each formed in a predetermined size which corresponds to the overall size of the body 140. As seen in FIG. 2A, each chamfer 147 is formed to have a horizontal length L and to extend at an angle A relative to the top surface 145 of the body 140. In the module 110, the chamfers 147 are identically sized and are each formed such that the length L is about 0.15 millimeters. Sizing each chamfer 147 such that the length L is shorter than approximately 0.15 millimeters could result in a problem with the interface/insertion of the module 110 to a case 150 of the memory card 100, as will be discussed in more detail below. The preferred angle A of each of the chamfers 147 relative to the top surface 145 of the body 140 is preferably in the range of from approximately 30° to approximately 60°. The intended functionality of the chamfers 147 to serve as guides for the module 110 when the same is inserted into the case 150 could be compromised if the length L of each of the chamfers 147 is too short, or the angle A of each of the chamfers 147 is too large. In addition, since a gap of at least 0.15 millimeters is typically defined between a non-chamfered module and a case in prior art memory cards as explained above, the formation of each of the chamfers 147 to have a length L of at least 0.15 millimeters typically suffices to allow the chamfers 147 to satisfy their intended guide purposes.

Though the chamfers 147 are shown in FIG. 2B as being formed between the top surface 145 of the body 140 and each of the side surfaces 141, 142, 143, 144 thereof, those of ordinary skill in the art will recognize that the body 140 may alternatively be formed to include less than four chamfers 147. In this regard, in two contemplated alternative configurations for the body 140, only a single pair of chamfers 147 extends between the top surface 145 and respective ones of the opposed front and rear side surfaces 141, 142, or between the top surface 145 and respective ones of the opposed lateral side surfaces 143, 144. In another alternative configuration, only a single pair of chamfers 147 is provided, with one such chamfer 147 being formed between the top surface 145 and one of the front and rear side surfaces 141, 142, and the remaining chamfer 147 being formed between the top surface 145 and one of the lateral side surfaces 143, 144. In this particular arrangement, it is contemplated that each of the chamfers 147 will be formed to have a length L of at least 0.30 millimeters (i.e., approximately twice the length L of the configuration wherein the chamfers 147 are provided in one or more opposed pairs).

As indicated above, in addition to the module 110, the memory card 100 comprises a case 150. The case 150 has a plate-like shape of predetermined thickness. More particularly, as seen in FIGS. 1A-1C, the case 150 defines a generally planar bottom surface 151 and an opposed, generally planar top surface 152. In addition, the case 150 defines a generally planar front side 153 and an opposed, generally planar rear side 154. Extending generally perpendicularly from the rear side 154 is an opposed pair of generally planar lateral sides 155, 156 of the case 150. The case 150 is further formed to include at least one generally planar chamfer 157 which extends angularly between the front side 153 and one of the lateral sides 155, 156. Formed in the bottom surface 151 of the case 150 is a recess or cavity 158 which is sized and configured to accommodate the module 110 in the manner shown in FIGS. 1B and 1C. In the memory card 100, the module 110 is inserted into and secured within the cavity 158 in a manner which will be discussed below.

In the memory card 100, the cavity 158 is preferably oriented within the case 150 so as to be disposed in relative close proximity to the front side 153 thereof. As indicated above, the shape of the cavity 158 is complimentary to that of the module 110, the cavity 158 shown in FIG. 1C having a generally quadrangular configuration defining four separate corners. However, those of ordinary skill in the art will recognize that the shape of the cavity 158 is not limited to such a four cornered configuration, with it being contemplated that the cavity 158 may take the form of any one of various shapes depending on the shape of the module 110. The depth of the cavity 158 is preferably sized such that when the module 110 is fully advanced thereinto and secured therewithin, the solder mask 127 disposed on the lower surface 121 of the insulative layer 123 of the circuit board 120 will extend in substantially flush, continuous relation to the bottom surface 151 of the case 150, as also shown in FIG. 1C.

Referring now to FIGS. 3A-3D, the cavity 158 of the case 150 is further sized such that when the module 110 is inserted into the cavity 158, the facial clearances between the internal side walls of the cavity 158 and the side surfaces of the module 110 can be minimized. An exemplary "facial clearance" is indicated by the dimension "a" in FIG. 3A. More particularly, the cavity 158 is preferably formed such that the facial clearance between each internal side wall of the cavity 158 and a respective one of the side walls 141, 142, 143, 144 of the body 140 is less than about fifty micrometers, and preferably less than about twenty-five micrometers. If such facial clearances were to exceed approximately fifty micrometers, there is a possibility that the adhesive used to secure the module 110 to the case 150 may flow out onto the bottom surface 151 of the case 150, and that such facial clearances will be visible to the naked eye due to the excessive size thereof. In order to form the facial clearances between the internal side walls of the cavity 158 and the corresponding side walls of the module 110 to be less than fifty micrometers, it is contemplated that the size of the cavity 158 can initially be determined, with the module 110 thereafter being sized accordingly. Alternatively, the size of the module 110 can first be determined, with the cavity 158 thereafter being sized accordingly.

In the memory card 100, the module 110 is secured within the cavity 158 by a layer 160 of adhesive which is preferably applied to the internal, innermost top wall of the cavity 158 and/or on the top surface 145 of the body 140 in a predetermined thickness. The layer 160 may be formed using a film type adhesion tape or a liquid adhesive. When the module 110 is advanced into the cavity 158, the adhesive layer 160 is interposed between the top surface 145 and the internal top wall of the cavity 158, thus adhering and affixing the module 110 to the case 150. As indicated above, the depth of the cavity 158 is preferably sized such that when the module 110 is secured therein via the layer 160, the solder mask 127 disposed on the lower surface 121 of the insulative layer 123 of the circuit board 120 is substantially flush or continuous with the generally planar bottom surface 151 of the case 150.

Because the facial clearances between the cavity 158 and the module 110 are formed within the above-described parameters, a liquid adhesive layer 160 will typically not flow out on to the bottom surface 151 of the case 150 through such minimal facial clearances. Further, since the liquid adhesive layer 160 is flowable, it is uniformly coated between the top surface 145 and the internal top wall of the cavity 158, thereby increasing the adhesion strength of the adhesive layer 160. Moreover, because the cavity 158 and the chamfers 147 formed on the body 140 of the module 110 increase the contact area of the adhesive layer 160, the adhesion strength of the adhesive layer 160 is further increased. Thus, when constructing the memory card 100, it is not necessary to use a film type adhesion tape which is relatively expensive, a liquid adhesive of lower cost being suitable for the reasons described above. Though being of minimal size, the facial clearances between the module 110 and the corresponding internal side walls of the cavity 158 do provide some space capable of being filled with excess liquid adhesive, even though such excess adhesive will typically not flow onto the bottom surface 151 of the case 150.

FIGS. 3A-3D further illustrate the complete process of inserting the module 110 into the cavity 158 of the case 150. Due to the inclusion of the chamfers 147 in the body 140, the module 110 can be easily guided and inserted into the cavity 158 even if not correctly aligned therewith, and despite the minimal facial clearances of less than about 50 micrometers between the side surfaces of the module 110 and the corresponding internal side walls of the cavity 158. Further, even if there is excessive adhesive in the adhesive layer 160, the possibility that such excess adhesive flows out of the cavity 158 onto the bottom surface 151 of the case 150 is minimized due to the extremely small facial clearances described above.

Figure 4:
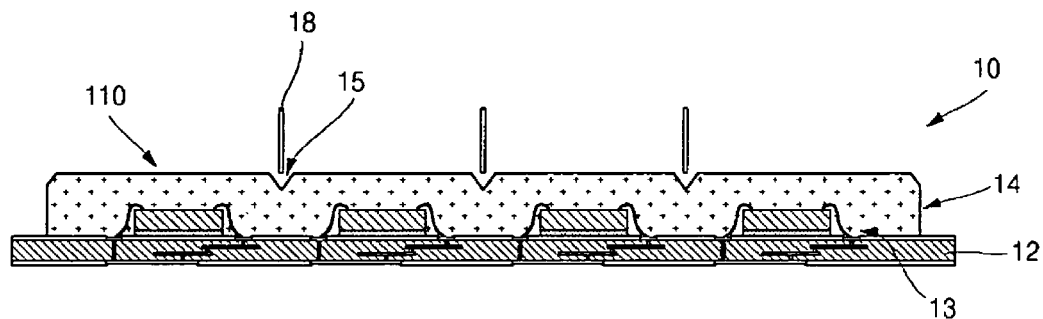
FIG. 4 is a cross-sectional view illustrating a first process for simultaneously fabricating multiple modules which each have the structural attributes shown in FIG. 2A from a common module array.

Referring now to FIG. 4, there is provided a cross-sectional view illustrating a first process for simultaneously fabricating multiple modules 110 each having the above-described structural attributes from a common module array 10. The module array 10 comprises a circuit board array 12 which itself comprises a plurality of the above-described circuit boards 120 in an integrally connected, pre-singulated state. The circuit boards 120 within the circuit board array 12 are typically arranged in rows and columns. An electronic circuit device array 13 is mounted to the circuit board array 12 such that the individual electronic circuit devices 130 of the electronic circuit device array 13 are mounted to respective ones of the circuit boards 120 of the circuit board array 12 in the manner described above in relation to the individual module 110. Subsequent to the mounting of the electronic circuit device array 13 to the circuit board array 12, the electronic circuit device array 13 and exposed portions of the top surface of the circuit board array 12 are covered by a layer of encapsulant material which hardens into a mold cap 14. As seen in FIG. 4, the mold cap 14 is formed to include a plurality of notches or grooves 15 which each have a generally V-shaped cross-sectional configuration. The apexes of the grooves 15 are spaced from each other at intervals which correspond to the sizes of the individual modules 110 which will ultimately be singulated from the module array 10. As indicated above, the grooves 15 are formed by the mold used to form the mold cap 14.

Subsequent to the formation of the mold cap 14, the module array 10 is singulated along the apexes of the grooves 15 by using separate saw blades 18. As will be recognized, the saw blades 18 cut through both the mold cap 14 and the circuit board array 12, and effectively separate or singulate the module array 10 into the individual modules 110, each of which has the above-described structural attributes. As will further be recognized, two or more chamfers 147 of each singulated module 110 are formed as a result of the passage of the saw blades 18 through the apexes of the adjacent grooves 15.

Figure 5A:
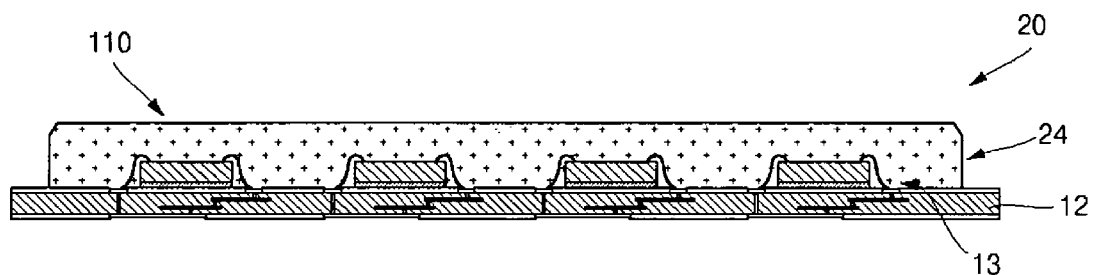
FIGS. 5A-5C are cross-sectional views illustrating a second process for simultaneously fabricating multiple modules which each have the structural attributes shown in FIG. 2A from a common module array.
Figure 5B:
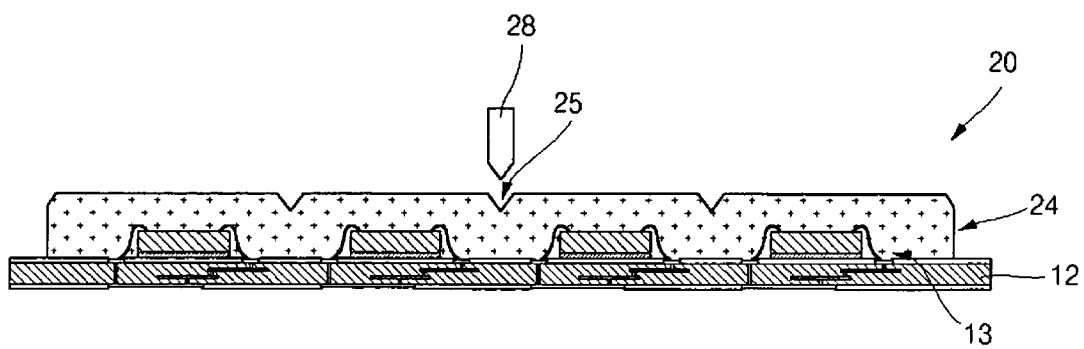
Figure 5C:
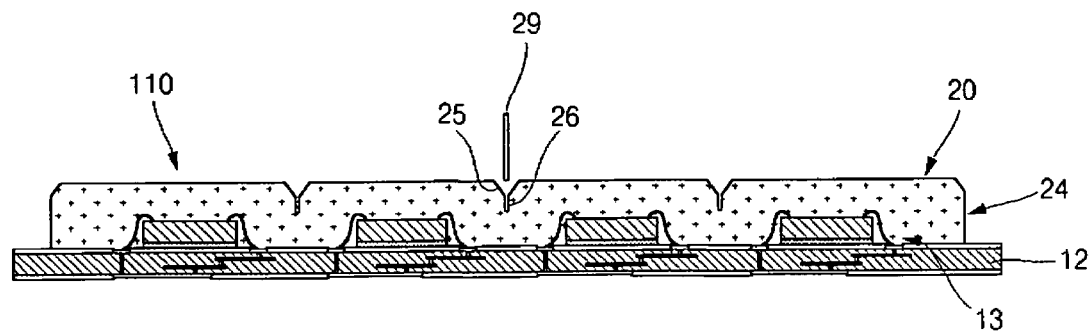

FIGS. 5A-5C provide cross-sectional views illustrating a second process for simultaneously fabricating multiple modules 110 which each have the above-described structural attributes, the second process comprising an alternative to the first process shown and described above in relation to FIG. 4. The initial stages of this alternative second process mirror those described above in relation to FIG. 4, except that the mold cap 14 of FIG. 4 is substituted with the mold cap 24 shown in FIG. 5A which is not formed to include the above-described grooves 15. Rather, in contrast to the mold cap 14, the mold cap 24 is formed to initially define a generally planar top surface. The combination of the mold cap 24, circuit board array 12, and electronic circuit device array 13 collectively form the module array 20 depicted in FIGS. 5A-5C.

As seen in FIG. 5B, subsequent to the formation of the mold cap 24, a first saw blade 28 is used to form a plurality of grooves 25 into the top surface of the mold cap 24. Each of the grooves 25 is formed to be of a predetermined depth and to have a generally V-shaped cross-sectional configuration. In this regard, the grooves 25 may be sized identically to the above-described grooves 15, and are themselves spaced from each other at intervals which correspond to the sizes of the individual modules 110 which will ultimately be singulated from the module array 20. As will be recognized, the first saw blade 28 will define a cutting edge formed in a shape corresponding to that of each groove 25.

As seen in FIG. 5C, after the grooves 25 have been formed in the mold cap 24 through the use of the first saw blade 28, a second saw blade 29 is used to effectively singulate the module array 20 into the individual modules 110. More particularly, as described above in relation to the singulation of the module array 10 through the use of the saw blades 18, the second saw blade 29 is used to singulate the module array 20 along the apexes of the previously formed grooves 25, the second saw blade 29 moving through the module array 20 along the path 26 as shown in FIG. 5C. As will be recognized, like the saw blades 18 described above, the second saw blade 29 will pass through the mold cap 24 and the circuit board array 12 to effectively singulate and separate the individual modules 110 within the module array 20 from each other. The process shown in FIGS. 5A-5C provides advantages over that shown in FIG. 4 since the shapes of the grooves 25, and hence the shapes of the resultant chamfers 147 of the singulated modules 110, can be more easily changed or altered, such alteration being facilitated by simply changing the shape of the cutting edge of the first saw blade 28 used to form the grooves 25.

Figure 6:
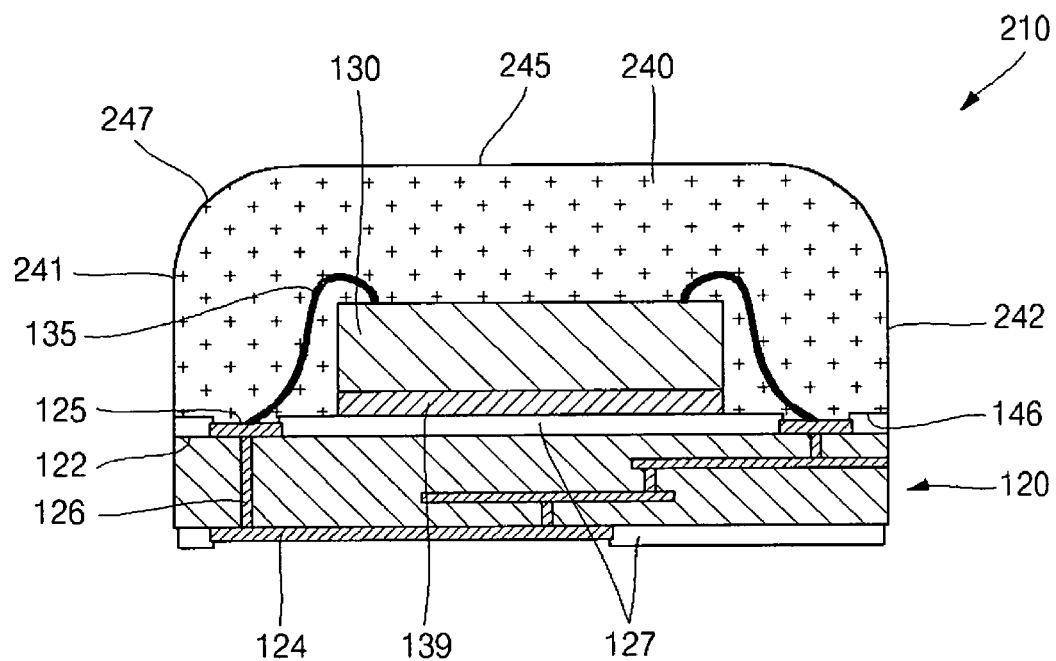
FIG. 6 is cross-sectional view of a memory card module constructed in accordance with a second embodiment of the present invention.

Referring now to FIG. 6, there is shown a memory card module 210 constructed in accordance with a second embodiment of the present invention. The module 210 of the second embodiment bears substantial similarity in construction to the module 110 of the first embodiment, with the 200 series reference numerals in FIG. 6 being used to identify the same structures identified by the corresponding 100 series reference numerals included in FIG. 2A. In this regard, only the distinctions between the modules 210, 110 will be discussed below.

In the module 210, each of the chamfers 247 of the body 240 is formed to have an arcuate, generally convex configuration. This is in contrast to the above-described chamfers 147 of the body 140 which each have a generally planar, flat configuration. Due the convex configuration of the chamfers 247, the module 210 has no abrupt transitional areas between the chamfers 247 and the corresponding side surfaces of the body 240, thus allowing the module 210 to be more smoothly guided and inserted into the cavity 158 of the case 150. The convex configuration of the chamfers 247 also effectively increases the surface area thereof in comparison to the chamfers 147, thus increasing the force of adhesion to the case 150 when the adhesive layer 160 is used to secure the module 210 within the cavity 158.

Figure 7:
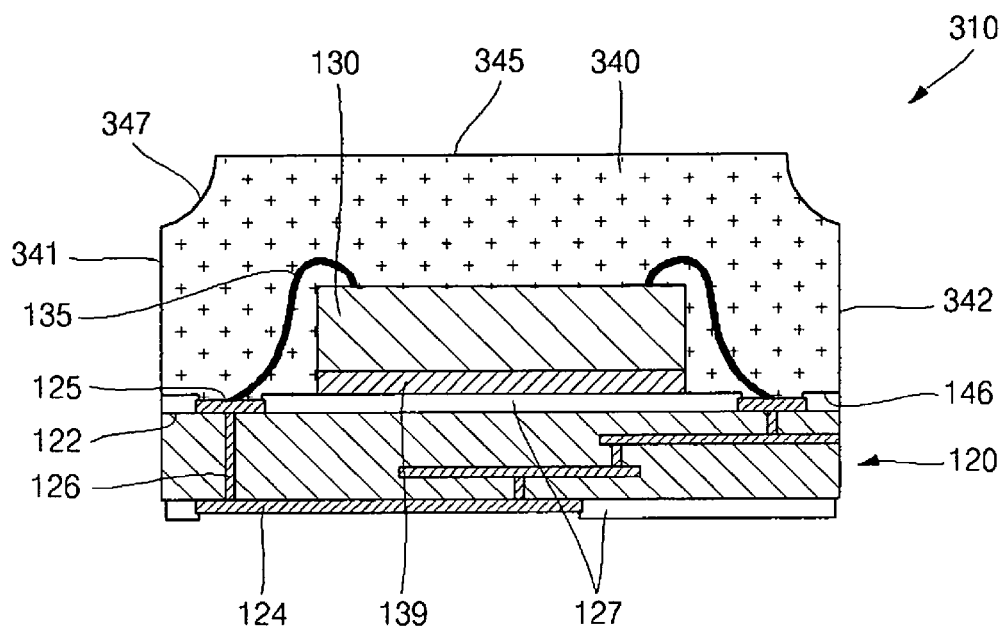
FIG. 7 is cross-sectional view of a memory card module constructed in accordance with a third embodiment of the present invention.

Referring now to FIG. 7, there is shown a memory card module 310 constructed in accordance with a third embodiment of the present invention. The module 310 of the third embodiment also bears substantial similarity in construction to the module 110 of the first embodiment, with the 300 series reference numerals in FIG. 7 being used to identify the same structures identified by the corresponding 100 series reference numerals included in FIG. 2A. In this regard, only the distinctions between the modules 310, 110 will be discussed below.

In the module 310, each of the chamfers 347 of the body 340 is formed to have an arcuate, generally concave configuration. This is in contrast to the above-described chamfers 147 of the body 140 which each have a generally planar, flat configuration. Due the concave configuration of the chamfers 347, the resultant increase in the space between the body 340 and the adjacent portions of the internal top and side walls of the cavity 158 further minimizes any potential for the liquid adhesive layer 160 to flow through the facial clearances and onto the bottom surface 151 of the case 150, even in the event an excessive amount of liquid adhesive is used to form the adhesive layer 160. The concave configuration of the chamfers 347 also effectively increases the surface area thereof in comparison to the chamfers 147, thus increasing the force of adhesion to the case 150 when the adhesive layer 160 is used to secure the module 310 within the cavity 158.

Figure 8A:
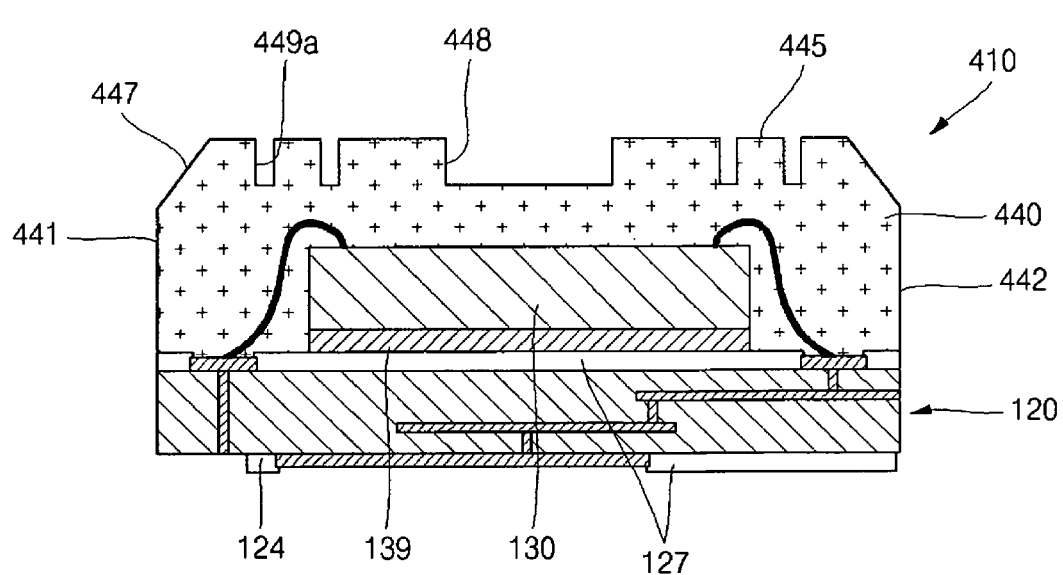
FIG. 8A is cross-sectional view of a memory card module constructed in accordance with a fourth embodiment of the present invention.
Figure 8B:
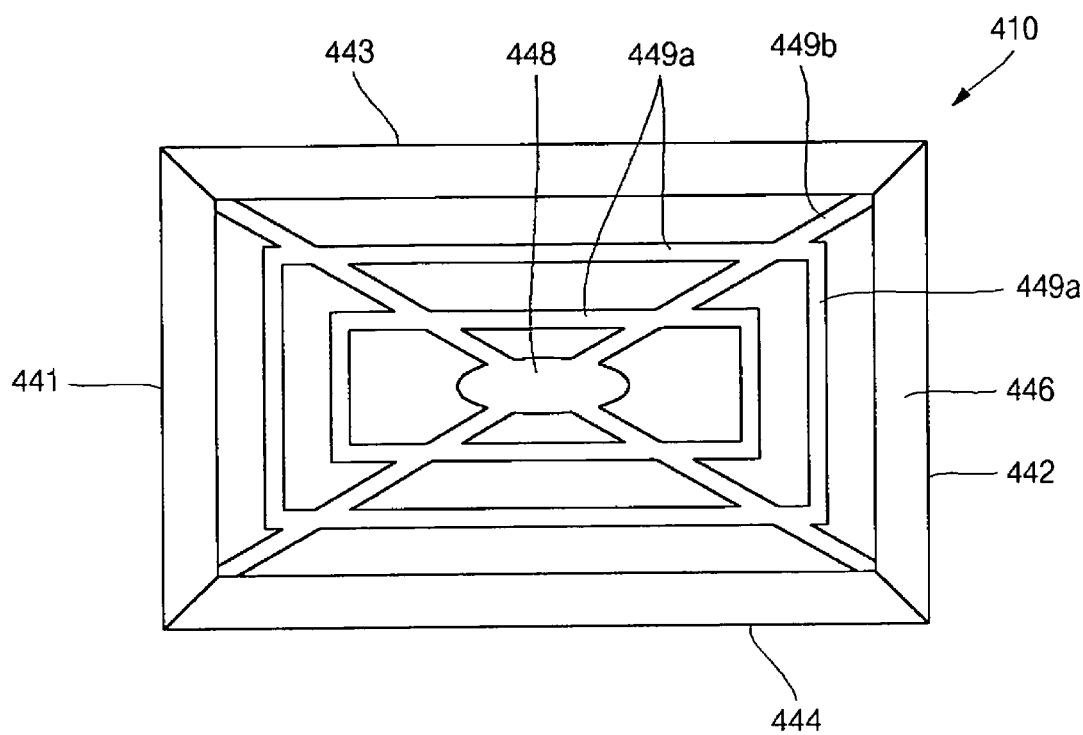
FIG. 8B is a top plan view of the module shown in FIG. 8A.
Figure 8C:
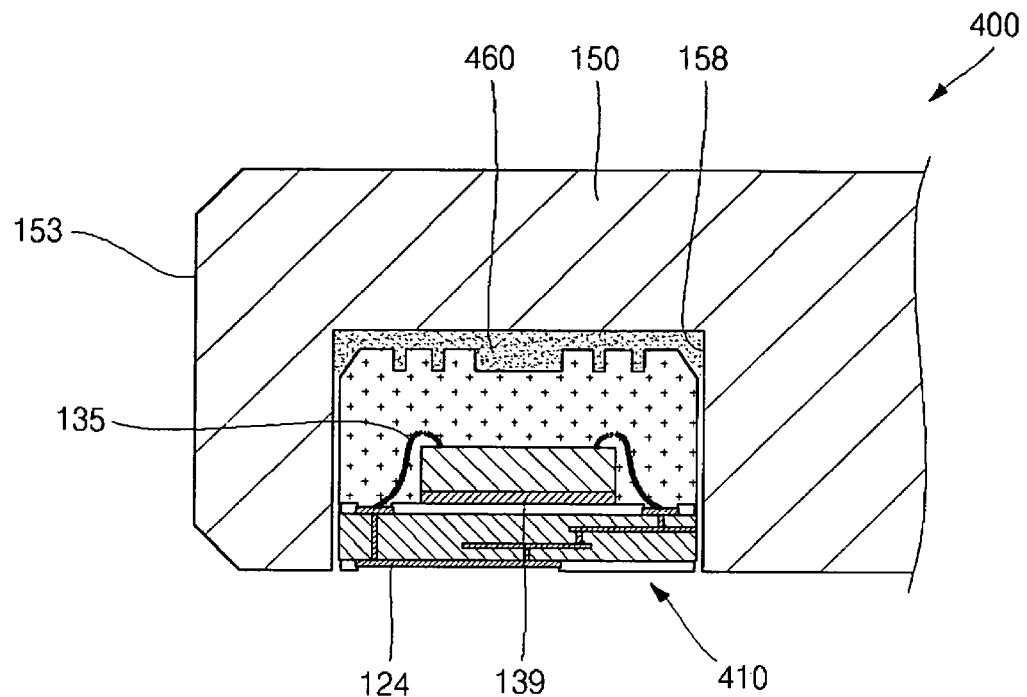
FIG. 8C is a partial cross-sectional of a memory card including the memory card module shown in FIGS. 8A and 8B.

Referring now to FIGS. 8A-8C, there is shown a memory card module 410 constructed in accordance with a fourth embodiment of the present invention. The module 410 of the fourth embodiment also bears similarity in construction to the module 110 of the first embodiment, with the 400 series reference numerals in FIGS. 8A and 8B being used to identify the same structures identified by the corresponding 100 series reference numerals included in FIG. 2A.

As best seen in FIGS. 8A and 8B, the body 440 of the module 410 is formed to include a top side cavity 448 which is located in the approximate center of the top surface 445 of the body 440. The top side cavity 448 is formed to be of a predetermined shape and depth and, as seen in FIG. 8B, has a generally oval configuration. In addition to the top side cavity 448, also formed in the top surface 445 of the body 440 are top side trenches 449a, 449b. In the module 410, two top side trenches 449a are provided, each of which has a generally quadrangular configuration. More particularly, an inner one of the top side trenches 449a circumvents the top side cavity 448, with an outer one of the top side trenches 449a circumventing the inner one thereof (i.e., the top side trenches 449a are concentric). In addition to the two top side trenches 449a, four top side trenches 449b are provided, with each of the top side trenches 449b communicating with the top side cavity 448 and extending toward a respective one of the four corners defined by the body 440. Thus, each of the top side trenches 449b intersects and communicates with each of the two top side trenches 449a. Additionally, each of the top side trenches 449b extends to chamfers 447 of the body 440, such chamfers 447 being identically configured to the chamfers 147 described above in relation to the module 110 of the first embodiment. The depths of the top side trenches 449, 449b are preferably equal to the depth of the top side cavity 448.

FIG. 8C depicts a memory card 400 assembled to include the module 410 of the fourth embodiment shown in FIGS. 8A and 8B. Due to the inclusion of the top side cavity 448 and trenches 449a, 449b in the top surface 445 of the body 440, the space defined between the module 410 and the internal top wall of the cavity 158 is substantially increased, thus minimizing any potential for the liquid adhesive layer 160 used to secure the module 410 to the case 150 to flow through the facial clearances onto the bottom surface 151 of the case 150, even in the event an excessive amount of liquid adhesive is used to form the adhesive layer 160. Moreover, since the liquid adhesive of the adhesive layer 160 coated onto the top surface 445 of the body 440 is able to smoothly flow into the spaces defined on the top side cavity 448 and the top side trenches 449a, 449b, the adhesive layer 460 can be more uniformly formed. Still further, the inclusion of the top side cavity 448 and top side trenches 449a, 449b effectively increases the surface area of the body 440 adhered to the case 150, thus increasing the force of adhesion to the case 150 when the adhesive layer 460 is used to secure the module 410 within the cavity 158.

Those of ordinary skill in the art will recognize that the particular shape, size and depth of the top side cavity 448 as shown in FIGS. 8A and 8B is exemplary only, and that alternative shapes, sizes and depths are contemplated to be within the spirit and scope of the present invention. Along these lines, the number, arrangement, shape and depth of the top side trenches 449a, 449b shown in FIGS. 8A and 8B is also exemplary only, in that such top side trenches 449a, 449b may be formed in alternative shapes, in differing numbers, and/or in differing arrangements.

Figure 9:
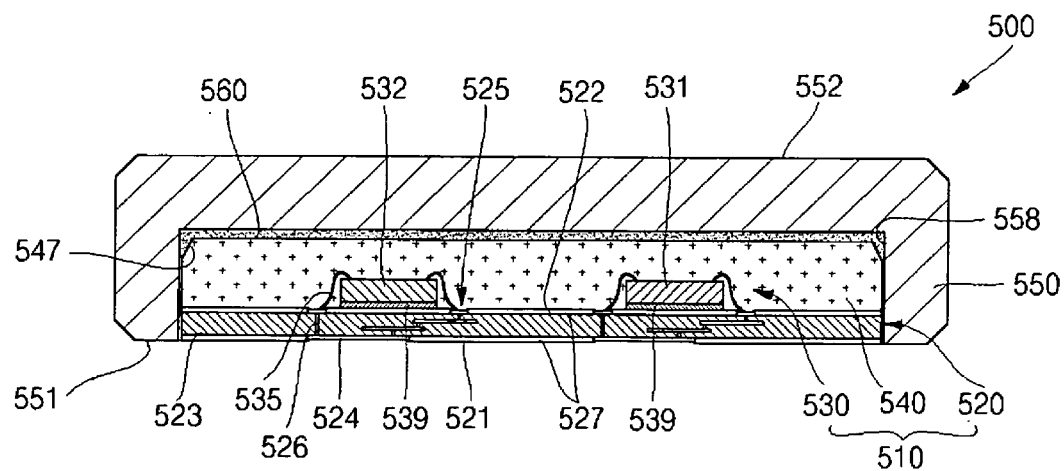
FIG. 9 is a cross-sectional view of a memory card including a memory card module constructed in accordance with a fifth embodiment of the present invention

Referring now to FIG. 9, there is shown a memory card 500 which is assembled through the use of a memory card module 510 constructed in accordance with a fifth embodiment of the present invention. The memory card 500 has the structural attributes of a mini SD (secure digital) card. The 500 series reference numerals in FIG. 9 are used to identify the same structures identified by the corresponding 100 series reference numerals included in FIG. 2A.

The module 510 of the memory card 500 comprises a circuit board 520, which itself includes an insulative layer 523 defining a generally planar lower surface 521 and an opposed, generally planar upper surface 522. Formed on the lower surface 521 of the insulative layer 523 in close proximity to one of the peripheral edge segments thereof is a plurality of input/output (I/O) pads 524. All or a substantial portion of the remainder of the lower surface 521 of the insulative layer 523 is covered by a solder mask 527. The side of the insulative layer 523 disposed closest to the I/O pads 524 will hereinafter be referred to as the front side, with the opposite side of the insulative layer 523 being referred to as the back side. Formed on the upper surface 522 of the insulative layer 523 is a conductive pattern 525 which is placed into electrical communication with the I/O pads 524 on the lower surface 521 through a conductive medium 526 formed through and/or upon the insulative layer 523. Such conductive medium 526 may include conductive vias which extend through the insulative layer 523, conductive traces which extend along the upper and lower surfaces 522, 521 of the insulative layer 523, or combinations thereof. All or a substantial portion of the remainder of the upper surface 522 of the insulative layer 523 is also covered by a solder mask 527. The circuit board 520 can be a hardened printed circuit board, a flexible printed circuit board, or any equivalent thereto, the present invention not being restricted to any particular type of circuit board 520.

Mounted to the solder mask 527 disposed upon the upper surface 522 of the insulative layer 523 of the circuit board 520 is an electronic circuit device 530. The mounting of the electronic circuit device 530 to the solder mask 527 disposed upon the upper surface 522 is preferably facilitated by a layer 539 of a suitable adhesive. As seen in FIG. 9, the electronic circuit device 530 comprises a spaced pair of semiconductor dies 531, 532 which are each electrically connected to the conductive pattern 525 formed on the upper surface 522 through the use of conductive wires 535. As will be recognized, the conductive pattern 525 and/or conductive medium 526 of the circuit board 520 may be used to facilitate the placement of the electronic circuit device 530 into electrical communication with the I/O pads 524 in any desired pattern or arrangement. Those of ordinary skill in the art will recognize that rather than comprising the semiconductor dies 531, 532, the electronic circuit device 530 may comprise a semiconductor die or a semiconductor package in combination with various passive devices (e.g., a resistor and/or a condenser). In this regard, the type, number and arrangement of the components included in the electronic circuit device 530 may be selectively varied depending on the desired application for the memory card 500, the semiconductor dies 531, 532 shown in FIG. 9 being exemplary only. All that is necessary is that the circuit board 520 be configured to facilitate the electrical communication between any such component(s) and the I/O pads 524 in a prescribed manner. Along these lines, the number of I/O pads 524 included in the circuit board 520 is also variable, in that the number of such I/O pads 524 may be varied according to the particular application for the memory card 500.

In the module 510 of the fifth embodiment, the electronic circuit device 530, the conductive pattern 525, the conductive wires 535, and the exposed portion of the solder mask 527 disposed upon the upper surface 522 of the insulative layer 523 are covered by a layer of encapsulant material which hardens into a body 540 of the module 510. The body 540 has the same structural attributes of the body 140 described above in relation to the module 110 of the first embodiment, and is formed to include chamfers 547 which correspond to the chamfers 147 of the module 110.

In addition to the module 510, the memory card 500 comprises a case 550. The case 550 has a plate-like shape of predetermined thickness. More particularly, the case 550 defines a generally planar bottom surface 551 and an opposed, generally planar top surface 552. Formed in the bottom surface 551 of the case 550 is a recess or cavity 558 which is sized and configured to accommodate the module 510 in the manner shown in FIG. 9. The depth of the cavity 558 is preferably sized such that when the module 510 is fully advanced thereinto and secured therewithin, the solder mask 527 disposed on the lower surface 521 of the insulative layer 523 of the circuit board 520 will extend in substantially flush, continuous relation to the bottom surface 551 of the case 550. Moreover, the cavity 558 is preferably formed such that the facial clearance between each internal side wall of the cavity 558 and a respective one of the side walls of the body 540 are within the same general parameters described above in relation to the module 110 and the case 150.

In the memory card 500, the module 510 is secured within the cavity 558 by a layer 560 of adhesive which is preferably applied to the internal, innermost top wall of the cavity 558 and/or on the top surface of the body 540 in a predetermined thickness. The layer 560 may be formed using a film type adhesion tape or a liquid adhesive. When the module 510 is advanced into the cavity 558, the adhesive layer 560 is interposed between the top surface of the body 540 and the internal top wall of the cavity 558, thus adhering and affixing the module 510 to the case 550. As indicated above, the depth of the cavity 558 is preferably sized such that when the module 510 is secured therein via the layer 560, the solder mask 527 disposed on the lower surface 521 of the insulative layer 523 of the circuit board 520 is substantially flush or continuous with the generally planar bottom surface 551 of the case 550.

Because the facial clearances between the cavity 558 and the module 510 are formed within the above-described parameters, a liquid adhesive layer 560 will typically not flow out on to the bottom surface 551 of the case 550 through such minimal facial clearances. Further, since the liquid adhesive layer 560 is flowable, it is uniformly coated between the top surface of the body 540 and the internal top wall of the cavity 558, thereby increasing the adhesion strength of the adhesive layer 560. Moreover, because the cavity 558 and the chamfers 547 formed on the body 540 of the module 510 increase the contact area of the adhesive layer 560, the adhesion strength of the adhesive layer 560 is further increased. Thus, when constructing the memory card 500, it is not necessary to use a film type adhesion tape which is relatively expensive, a liquid adhesive of lower cost being suitable for the reasons described above. Though being of minimal size, the facial clearances between the module 510 and the corresponding internal side walls of the cavity 558 do provide some space capable of being filled with excess liquid adhesive, even though such excess adhesive will typically not flow onto the bottom surface 551 of the case 550.

Figure 10:
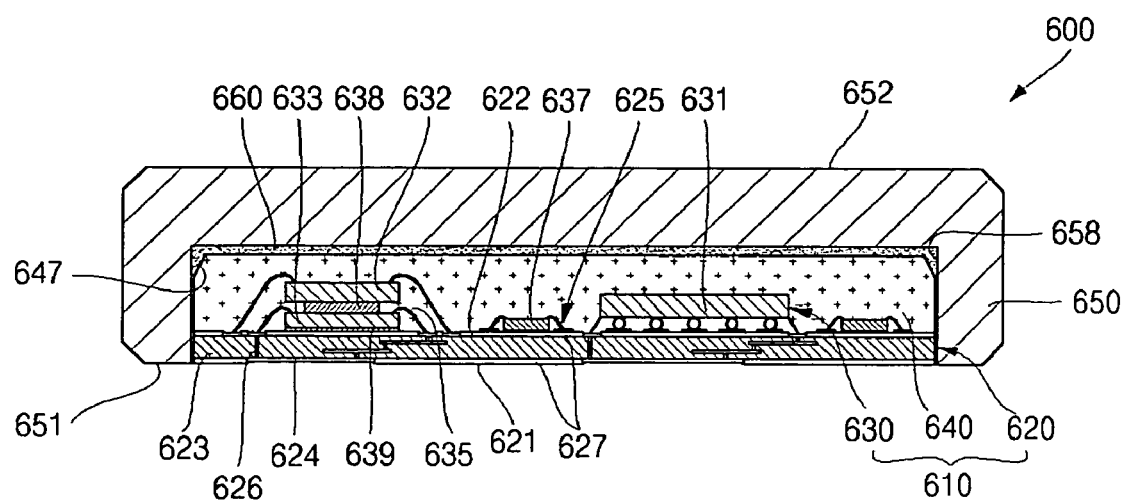
FIG. 10 is a cross-sectional view of a memory card including a memory card module constructed in accordance with a sixth embodiment of the present invention.

Referring now to FIG. 10, there is shown a memory card 600 which is assembled through the use of a memory card module 610 constructed in accordance with a sixth embodiment of the present invention. The memory card 600 also has the structural attributes of a mini SD (secure digital) card and bears substantial structural similarity to the memory card 500 shown and described in relation to FIG. 9. In this regard, the 600 series reference numerals in FIG. 10 are used to identify the same structures identified by the corresponding 500 series reference numerals included in FIG. 9.

The module 610 of the memory card 600 comprises a circuit board 620, which itself includes an insulative layer 623 defining a generally planar lower surface 621 and an opposed, generally planar upper surface 622. Formed on the lower surface 621 of the insulative layer 623 in close proximity to one of the peripheral edge segments thereof is a plurality of input/output (I/O) pads 624. All or a substantial portion of the remainder of the lower surface 621 of the insulative layer 623 is covered by a solder mask 627. The side of the insulative layer 623 disposed closest to the I/O pads 624 will hereinafter be referred to as the front side, with the opposite side of the insulative layer 623 being referred to as the back side. Formed on the upper surface 622 of the insulative layer 623 is a conductive pattern 625 which is placed into electrical communication with the I/O pads 624 on the lower surface 621 through a conductive medium 626 formed through and/or upon the insulative layer 623. Such conductive medium 626 may include conductive vias which extend through the insulative layer 623, conductive traces which extend along the upper and lower surfaces 622, 621 of the insulative layer 623, or combinations thereof. All or a substantial portion of the remainder of the upper surface 622 of the insulative layer 623 is also covered by a solder mask 627. The circuit board 620 can be a hardened printed circuit board, a flexible printed circuit board, or any equivalent thereto, the present invention not being restricted to any particular type of circuit board 620.

Mounted to the solder mask 627 disposed on the upper surface 622 of the insulative layer 623 of the circuit board 620 is an electronic circuit device 630. As seen in FIG. 10, the electronic circuit device 630 comprises a flip chip semiconductor die 631, and a stacked pair of semiconductor dies 632, 633 which are secured to each other by an intervening adhesive spacer 638. The electronic circuit device 630 further includes various passive devices 637. The mounting of at least the lower semiconductor die 633 of the stack to the solder mask 627 disposed upon the upper surface 622 is preferably facilitated by a layer 639 of a suitable adhesive. The semiconductor dies 631, 632, 633 and the passive devices 637 are each electrically connected to the conductive pattern 625 formed on the upper surface 622, with such electrical connection for the semiconductor dies 632, 633 and the passive devices 637 being facilitated through the use of conductive wires 635. As will be recognized, the conductive pattern 625 and/or the conductive medium 626 of the circuit board 520 may be used to facilitate the placement of the electronic circuit device 630 into electrical communication with the I/O pads 624 in any desired pattern or arrangement. Those of ordinary skill in the art will recognize that the type, number and arrangement of the components included in the electronic circuit device 630 may be selectively varied depending on the desired application for the memory card 600, those components shown in FIG. 10 being exemplary only. All that is necessary is that the circuit board 620 be configured to facilitate the electrical communication between any such component(s) and the I/O pads 624 in a prescribed manner. Along these lines, the number of I/O pads 624 included in the circuit board 620 is also variable, in that the number of such I/O pads 624 may be varied according to the particular application for the memory card 600.

In the module 610 of the sixth embodiment, the electronic circuit device 630, the conductive pattern 625, the conductive wires 635, and the exposed portion of the solder mask 627 disposed upon the upper surface 622 of the insulative layer 623 are covered by a layer of encapsulant material which hardens into a body 640 of the module 610. The body 640 has the same structural attributes of the body 140 described above in relation to the module 110 of the first embodiment, and is formed to include chamfers 647 which correspond to the chamfers 147 of the module 110.

In addition to the module 610, the memory card 600 comprises a case 650. The case 650 has a plate-like shape of predetermined thickness. More particularly, the case 650 defines a generally planar bottom surface 651 and an opposed, generally planar top surface 652. Formed in the bottom surface 651 of the case 650 is a recess or cavity 658 which is sized and configured to accommodate the module 610 in the manner shown in FIG. 10. The depth of the cavity 658 is preferably sized such that when the module 610 is fully advanced thereinto and secured therewithin, the solder mask 627 disposed on the lower surface 621 of the insulative layer 623 of the circuit board 620 will extend in substantially flush, continuous relation to the bottom surface 651 of the case 650. Moreover, the cavity 658 is preferably formed such that the facial clearance between each internal side wall of the cavity 658 and a respective one of the side walls of the body 640 are within the same general parameters described above in relation to the module 110 and the case 150.

In the memory card 600, the module 610 is secured within the cavity 658 by a layer 660 of adhesive which is preferably applied to the internal, innermost top wall of the cavity 658 and/or on the top surface of the body 640 in a predetermined thickness. The layer 660 may be formed using a film type adhesion tape or a liquid adhesive. When the module 610 is advanced into the cavity 658, the adhesive layer 660 is interposed between the top surface of the body 640 and the internal top wall of the cavity 658, thus adhering and affixing the module 610 to the case 650. As indicated above, the depth of the cavity 658 is preferably sized such that when the module 610 is secured therein via the layer 660, the solder mask 627 disposed on the lower surface 621 of the insulative layer 623 of the circuit board 620 is substantially flush or continuous with the generally planar bottom surface 651 of the case 650.

Because the facial clearances between the cavity 658 and the module 610 are formed within the above-described parameters, a liquid adhesive layer 660 will typically not flow out on to the bottom surface 651 of the case 650 through such minimal facial clearances. Further, since the liquid adhesive layer 660 is flowable, it is uniformly coated between the top surface of the body 640 and the internal top wall of the cavity 658, thereby increasing the adhesion strength of the adhesive layer 660. Moreover, because the cavity 658 and the chamfers 647 formed on the body 640 of the module 610 increase the contact area of the adhesive layer 660, the adhesion strength of the adhesive layer 660 is further increased. Thus, when constructing the memory card 600, it is not necessary to use a film type adhesion tape which is relatively expensive, a liquid adhesive of lower cost being suitable for the reasons described above. Though being of minimal size, the facial clearances between the module 610 and the corresponding internal side walls of the cavity 658 do provide some space capable of being filled with excess liquid adhesive, even though such excess adhesive will typically not flow onto the bottom surface 651 of the case 650.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process, may be implemented by one skilled in the art in view of this disclosure.

What is claimed is:

1. A memory card comprising:
a circuit board having at least one I/O pad formed thereon;
at least one electronic circuit device mounted to the circuit board and electrically connected to the I/O pad;
a body covering the electronic circuit device and a portion of the circuit board, the electronic circuit device, the circuit board and the body collectively defining a module of the memory card, the body including:
a top surface;
a front side surface;
a rear side surface disposed in opposed relation to the front side surface;
a pair of lateral side surfaces extending between the front and rear side surfaces in opposed relation to each other; and
at least two chamfers formed between the top surface and respective ones of an opposed pair of the side surfaces;
a case defining a cavity which is sized an configured to accommodate the module which is inserted into the cavity of the case.

2. The memory card of claim 1 wherein the body includes four chamfers formed between the top surface and respective ones of the side surfaces thereof.

3. The memory card of claim 1 wherein:
the top surface of the body extends along a body plane;
each of the chamfers is formed to be of a predetermined length taken along the body plane from the top surface of the body; and
each of the chamfers is formed to be of a predetermined angle relative to the top surface of the body.

4. The memory card of claim 1 wherein each of the chamfers has a generally planar configuration.

5. The memory card of claim 1 wherein each of the chamfers has a generally convex configuration.

6. The memory card of claim 1 wherein each of the chamfers has a generally concave configuration.

7. The memory card of claim 1 wherein the body is formed to include a top side cavity within the top surface thereof.

8. The memory card of claim 7 wherein the body is formed to include at least one top side trench extending between the top side cavity and the chamfers.

9. The memory card of claim 8 wherein at least one of the top side trenches communicates with the top side cavity.

10. The memory card of claim 1 wherein:
the circuit board defines a plurality of side surfaces; and
the body is formed such that the side surfaces thereof are substantially flush with respective ones of the side surfaces of the circuit board.

11. The memory card of claim 1 wherein:
the cavity of the case is defined by internal side walls of the case; and
the module is sized and configured relative to the cavity such that facial clearances defined between the side surfaces of the body and corresponding ones of the internal side walls of the case are each less than about twenty-five micrometers.

12. The memory card of claim 1 further comprising an adhesive layer disposed between and contacting both the body of the module and the case.

13. The memory card of claim 1 wherein the circuit board comprises an insulative layer defining opposed upper and lower surfaces, a plurality of the I/O pads are disposed on the lower surface, and the electronic circuit device is mounted to the upper surface and electrically connected to the I/O pads.

14. The memory card of claim 1 wherein the electronic circuit device comprises at least one semiconductor die.

15. The memory card of claim 1 wherein the memory card is selected from the group consisting of:
 a reduced size multi-media card;
 a secure digital card; and
 a mini secure digital card.

16. The memory card of claim 1 wherein the electronic circuit device comprises at least two semiconductor dies mounted to the circuit board and electrically connected to the I/O pad.

17. A memory card comprising:
 a circuit board having at least one I/O pad formed thereon;
 at least one electronic circuit device mounted to the circuit board and electrically connected to the I/O pad;
 a body covering the electronic circuit device and a portion of the circuit board, with the electronic circuit device, the circuit board and the body collectively defining a module of the memory card, the body including a top surface, a front side surface, a rear side surface disposed in opposed relation to the front side surface, and a pair of lateral side surfaces extending between the front and rear side surfaces in opposed relation to each other; and
 a case defining a cavity which is sized and configured to accommodate the module which is inserted into and secured within the cavity of the case;
 the body including a means for guiding and facilitating the insertion of the module into the cavity of the case, the guide means being formed between the top surface and respective ones of an opposed pair of the side surfaces of the body.

18. The memory card of claim 17 wherein the guide means is formed between the top surface and each of the side surfaces of the body.

19. The memory card of claim 17 wherein:
 the top surface of the body extends along a body plane;
 the guide means has a predetermined length taken along the body plane from the top surface of the body; and
 the guide means extends at a predetermined angle relative to the top surface of the body.

* * * * *